United States Patent
Kobayashi et al.

(10) Patent No.: US 6,382,172 B1
(45) Date of Patent: May 7, 2002

(54) FUEL TANK AND GENERAL PURPOSE ENGINE EQUIPPED WITH THE SAME

(75) Inventors: Kazuyuki Kobayashi; Hiroyoshi Kouchi; Shogo Nakamura; Shin Mizukami, all of Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/194,066

(22) PCT Filed: Mar. 19, 1998

(86) PCT No.: PCT/JP98/01169

§ 371 Date: Jul. 20, 1999

§ 102(e) Date: Jul. 20, 1999

(87) PCT Pub. No.: WO98/42972

PCT Pub. Date: Jan. 10, 1998

(30) Foreign Application Priority Data

Mar. 21, 1997 (JP) ............................................. 9-087685

(51) Int. Cl.⁷ ................................................. F02B 77/00
(52) U.S. Cl. ................... 123/198 D; 123/518; 220/4.14
(58) Field of Search .................... 123/198 D, 198 E, 123/518, 519, 520, 516; 220/4.14, 905

(56) References Cited

U.S. PATENT DOCUMENTS

| | | | | |
|---|---|---|---|---|
| 4,174,245 A | * | 11/1979 | Martineau | .................... 156/245 |
| 4,721,070 A | * | 1/1988 | Tanaka et al. | .................. 123/2 |
| 4,995,356 A | * | 2/1991 | Kronich | ................... 123/198 E |
| 5,338,151 A | * | 8/1994 | Kemmner et al. | .......... 415/55.1 |
| 5,438,965 A | * | 8/1995 | Aronsson et al. | ........ 123/198 E |
| 5,664,696 A | * | 9/1997 | Canga | ......................... 220/4.12 |
| 6,155,648 A | * | 12/2000 | Dombek et al. | ............. 398/1 C |

FOREIGN PATENT DOCUMENTS

| | | | | |
|---|---|---|---|---|
| JP | 8-310260 A | * | 11/1996 | |
| JP | 11-210457 A | * | 8/1999 | |
| JP | 2000-185563 A | * | 7/2000 | |

* cited by examiner

*Primary Examiner*—Henry C. Yuen
(74) *Attorney, Agent, or Firm*—Crowell & Moring LLP

(57) ABSTRACT

The object of this invention is to improve the safety of an engine by preventing fuel which might splash out of the fuel inlet on top of the fuel tank or drip onto the tank during fueling from coming in contact with the hot cylinder or any electrical components. Another object of this invention is to prevent vibration of the fuel tank and the noise which such vibration would cause. The fuel tank according to this invention has an upper and a lower portions joined by a flange, both of which are made from a resin material. The upper portion has a trapezoidal depression in its center which surrounds the fuel inlet and slopes downward toward one side of the tank. The overall surface of the upper portion is convex and also slopes downward toward the same side of the tank. A number of grooves on either side of the central depression run in the same direction and open onto the same side of the tank. The two halves of the tank are welded at the web of a ribbed flange which extends around the entire periphery.

10 Claims, 7 Drawing Sheets

FUEL TANK AND GENERAL PURPOSE ENGINE EQUIPPED WITH THE SAME

TECHNICAL FIELD

This invention concerns a fuel tank and the general purpose engine equipped with the same.

BACKGROUND

Fuel tanks for automobile engines or the sort of general purpose engines used in farm equipment are produced by pressing an upper portion and a lower portion out of sheet metal and joining the two with a flange.

Fuel tanks for automobiles are generally installed under the floor panel in the rear part of the body. On the upper surface of the fuel tank are several grooves running from front to rear to accommodate the drive shafts and the live axle which transmits the steering force. Water tends to accumulate in these grooves, causing the tank to rust.

The fuel tank shown in FIGS. 5 and 6 is designed to prevent this problem from occurring. The design of this automobile fuel tank is disclosed in the publication (Kokai) of Japanese Utility Model 63-159324. FIG. 5 is a plan view and FIG. 6 is a cross section taken along line C—C in FIG. 5.

In FIGS. 5 and 6, 1 is the fuel tank; 11 is the gearbox to operate the rear wheels which is installed behind fuel tank 1; 12 and 13 are the pinion shaft and the rack shaft; 14 is the universal joint; and 15 is the shaft to transmit the steering force.

On the upper surface of the fuel tank 1 there is a groove 5 which traverses the tank from front to rear. This groove 5 accommodates the shaft 15, universal joint 14 and pinion shaft 12. The upper surface 2 of the tank is divided in two by the groove 5. On the rear portion of this surface, on either side of groove 5, are expanded portions 3, which help provide the necessary volume by protruding above the rest of the tank. The surface of the fuel tank 1 is coated with a rust-proofing substance. In the drawing, 4 is the fuel inlet; 31 is the surface where the fuel pump is mounted; 32 is the surface where the gauge unit is mounted; and 41 is the vent pipe.

The bottom of the groove 5, as can be seen in the lateral view in FIG. 6, comprises a long inclined surface 6 which slants down toward the front of the tank and a short inclined surface 7 which slants down toward the rear of the tank. Together, the two inclined surfaces give the groove a convex bottom. A resin coating is applied to the surface of the groove. Its apex 8 is located between the two expanded portions 3 at the rear of the tank. If any water should get into the groove 5, it will discharge along forward-sloping surface 6 and rearward-sloping surface 7 until it is discharged onto the ground at the edges of the tank.

Leaving automobile fuel tanks for a moment, let us turn our attention to the fuel tanks used in small general purpose engines. In these engines, the fuel inlet is generally on the top of the tank. When this type of fuel tank is filled, some of the fuel is liable to overflow from the fuel inlet or drip from the filling nozzle and spread over the surface of the tank. If it touches the cylinder, which is extremely hot, it may start on fire; if it comes in contact with an electrical component, it may lead to malfunctioning.

To prevent such problems, a design for the fuel tank of a small general purpose engine has been proposed such that there is a groove near the fuel inlet to carry off any spilled fuel. The groove is slanted like that shown in FIGS. 5 and 6 so that it can discharge the fuel in a given direction onto the ground.

We shall discuss such a fuel tank belonging to the prior art with reference to FIGS. 7 and 8.

FIG. 7 is a front view of a general purpose engine with the fuel tank described above; FIG. 8 is a plan view of the same engine. In FIGS. 7 and 8, 50 is the engine; 51 is the engine body; 52 (see FIG. 8) is the output shaft; 53 is the muffler; 54 is the air cleaner; 55 is the carburetor; 56 and 57 are the throttle and choke levers; 58 is the recoil starter; and 59 is the grip of the recoil starter 58. 61 is the fuel tank; 60 is the fuel cock which is connected to the fuel tank 61; 62 is the gauge unit; 63 is the label; and 64 is the cap for the fuel inlet. The cylinder shaft (not pictured) of engine body 51 is canted from below muffler 53 toward output shaft 52.

Fuel tank 61 comprises two pan-shaped portions which are pressed from thin copper sheeting. These portions are seam-welded along flange 61a, which runs along the periphery of the tank. The upper surface of the tank is level in the center and inclines slightly toward the edges. The area around fuel inlet 61b (see FIG. 7) in the center of the tank forms a depression bounded by conical surface 61c. The bottom of the depression extends toward recoil starter 58 and is inclined downward by a suitable amount toward the outer edge of the tank. Its cross section is a trapezoid with downward-sloping sides, which we shall call depression 61d. The end of this depression opens onto recoil starter 58. Any fuel spilled at the fuel inlet is thus conducted toward recoil starter 58 and sluiced off the top of the tank.

In the device pictured in FIGS. 7 and 8, the hot cylinder and the electrical components are concentrated on the left side of fuel tank 61. It is crucial, then, to prevent any spilled fuel from entering this region.

A fuel tank 61 for a general purpose engine like that shown in FIGS. 7 and 8 has a depression 61d around the fuel inlet on the top of the tank, and the bottom of the depression is angled toward recoil starter 58. If fuel overflows during fueling or drips from the nozzle onto the tank, it will flow in a sideways direction, either to the left or right of the tank, and be discharged out of depression 61d.

Similarly, with the fuel tank 1 for an automobile engine which is pictured in FIGS. 5 and 6, the spilled fuel which discharges into depression 5 goes down to the edge of the tank and is routed horizontally along the flange.

If this horizontally-discharging spilled fuel should come in contact with the hot cylinder, it may combust; if it should come in contact with electrical components, their function may be impaired or they may fail. And because both the tanks 61 and 1 consist of two halves made of thin copper sheeting, they tend to experience vibration and noise due to sympathetic vibration with the engine.

DESCRIPTION OF THE INVENTION

In view of the above-described problems inherent in the prior art, the first object in designing this invention is to improve the safety of the engine by preventing fuel which overflows the inlet or splashes onto the top of the tank during fueling from dripping down onto the hot cylinder or coming in contact with any electrical component.

The second object is to provide an engine whose fuel tank will not be subject to vibration or its resultant noise.

The invention which solves these problems is a fuel tank comprising an upper and lower half which are joined with a flange, with the fuel inlet on the top of the tank.

This fuel tank is distinguished by the fact that the upper portion of the tank has a depression on its upper surface which contains the fuel inlet and which angles downward toward one side of the tank. A gutter is provided on along the outer edge of the flange to collect the spilled fuel, and this gutter has a number of openings to conduct the fuel from the gutter to the exterior.

Preferably, in addition to the depression, a number of semicircular grooves which open in one direction should be provided on both sides of the depression in order to collect the spilled fuel.

It is also desirable that the gutter on one side of the tank down which the spilled fuel discharges should be segmented by ribs and one of the openings described above should be provided for each segment between the ribs.

The aforesaid fuel tank would be ideally suited for use with a general purpose engine.

In other words, this sort of engine has a fuel tank on top of the engine comprising an upper portion with a fuel inlet on its top and a lower portion which is mounted to the engine body. A recoil starter is placed on the end of the crankshaft. This engine is distinguished in the following way. On top of the upper portion of the fuel tank is a depression which contains the area around the fuel inlet and which slants downward toward the recoil starter. A gutter is provided along the periphery of the flange, and the openings in the gutter which lead the spilled fuel to the exterior are provided in the side of the recoil starter.

With this configuration, it is advisable to provide a number of semicircular grooves on the upper portion of the fuel tank which open to the recoil starter side. These grooves should be on the portion of the surface other than the depression on the surface of the tank in order to collect the spilled fuel effectively.

Furthermore, on the upper half of the tank, at least the portion of the gutter on the side of the engine where the recoil starter is located should be separated by ribs and one of the openings should be provided in each segment created by the ribs.

With this invention, any fuel which happens to drip onto the upper surface of the fuel tank during fueling will discharge primarily in one direction, namely, into the depression which opens onto the recoil starter. The spilled fuel will then enter the gutter along the flange and be conducted to the exterior via the openings in that gutter.

The fuel tank should be mounted on the body of the general purpose engine so that the portion of the gutter facing the recoil starter side is slightly lower than other portions of the gutter to conduct the spilled fuel to the recoil starter side.

In this general purpose engine, a generator or working machine is connected to the output shaft, and a muffler, which can be extremely hot, is installed above the shaft. With this invention, the gutter is located above the recoil starter, which does not reach extremely high temperatures or contain any troublesome components. Any spilled fuel which drips down off the top of the fuel tank is guided toward the recoil starter. This enhances the safety of the engine.

Fuel which traverses the top of the upper portion of the tank at a right angle to the direction in which it exits the depression (i.e., toward the recoil starter) will discharge into the semicircular grooves, which will conduct it toward the recoil starter. It will then discharge into the gutter and be discharged to the exterior through the openings.

With this invention, then, any fuel which spills on top of the fuel tank discharges through the depression and semicircular grooves and collects in the gutter along the flange.

It is discharged through multiple openings toward the relatively cool recoil starter. The fuel travels horizontally along the flange which joins the upper and lower halves of the tank, such that it never comes in contact with the hot cylinder or any electrical components. This design eliminates the danger of fire and the possibility that any of the electrical components will fail.

The gutter is segmented by ribs, so that even if a large volume of fuel discharges into it, the ribs will prevent the fuel from discharging along the periphery of the flange, and it will be discharged through the openings. The fuel thus discharges out of the gutter through the openings without having a chance to flow out over the flange.

According to this invention, the flange is a ribbed flange which extends along the entire periphery between the upper and lower halves of the tank. These halves should be welded at the web of the ribbed flange.

With this invention, the ribbed flange enhances the circumferential rigidity of the fuel tank and allows the gutter to function as a discharge route for the fuel.

The upper and lower portions of the fuel tank in this invention can be formed of a synthetic resin material.

With this invention, a thicker resin material can be used without increasing the weight in comparison with a metal sheet. The semicircular grooves increase the rigidity of the upper portion of the tank; the resulting strength allows realization of a fuel tank virtually free of vibration and noise.

This invention is a fuel tank of the sort in which an upper and lower portion, each of which has a virtually square surface, are joined at a flange, and in which the fuel inlet is in the center of the top of the upper portion.

This fuel tank is distinguished by the following. The upper and lower portions are formed from a resin. The upper portion has a depression in its center which contains the fuel inlet. The cross section of this depression is a trapezoid, one side of which is open and slopes downward. From the center, its upper surface is inclined in one direction toward its outer edge by a specified amount to form a convex surface. On either side of the depression and oriented along the same axis are a number of grooves which open onto the same edge.

The two halves of the tank are welded at the web of a ribbed flange which extends along the entire periphery between the two halves.

It is desirable that the grooves should have a semicircular cross section, and that multiple grooves be provided.

According to this invention, a gutter is provided along the entire periphery where the ribbed flange of the upper portion meets the outer surface of that portion. At least the portion of this gutter on the side of the tank where the fuel runs off is segmented by ribs and an opening to the exterior is provided in each segment created by the ribs.

With this invention, any fuel which happens to drip onto the upper surface of the tank during fueling will discharge primarily into the trapezoidal depression with the slanting bottom. The spilled fuel will then discharge into the gutter along the flange and be conducted to the exterior via the openings in this gutter.

Fuel which traverses the top of the upper portion of the tank at a right angle to the direction in which it exits the depression will flow into the semicircular grooves, which will conduct it toward one side of the tank, the side where it will be discharged. It will then discharge into the gutter and be discharged to the exterior through the openings.

With this invention, then, any fuel which splashes or drips onto the top of the upper portion of the tank will discharge into the trapezoidal depression or the semicircular grooves on either side of it. It will then flow toward the lower end of the depression or grooves and fall into the gutter along the flange, where it will also seek the lowest point. The fuel will then be discharged through the openings provided. Spilled fuel will travel along the flange, such that it will never come in contact with the hot cylinder or with any electrical component.

The gutter is segmented by ribs, so that even if a large volume of fuel discharges into it, the ribs will prevent the fuel from discharging along the periphery of the flange; instead, it will be discharged through the openings. The fuel thus has no chance to travel horizontally around the tank.

The upper and lower halves of the tank are formed from a resin, so a thicker sheet can be used without increasing the weight over that of a similar quantity of sheet metal. The semicircular grooves on either side of the trapezoidal depression increase the rigidity of the upper portion of the tank; the resulting strength significantly reduces the vibration and noise experienced by the tank.

A BRIEF DESCRIPTION OF THE DRAWINGS

EMBODIMENT

In this section we shall give a detailed explanation of a preferred embodiment of this invention with reference to the drawings. To the extent that the dimensions, materials, shape and relative position of the components described in this embodiment are not definitely fixed, the scope of the invention is not limited to those specified, which are meant to serve merely as illustrative examples.

Figure 1:
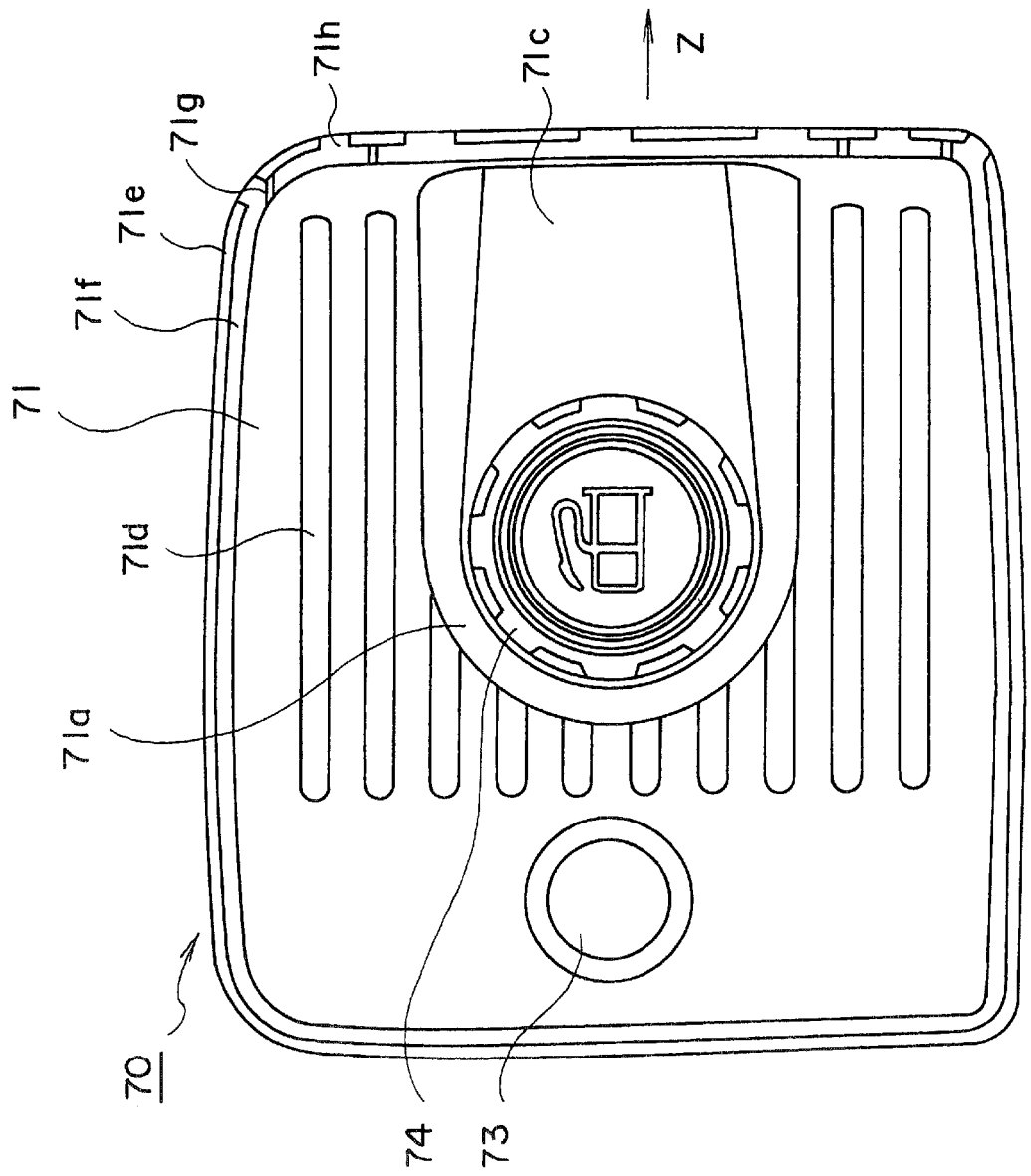
FIG. 1 is a plan view of the fuel tank of a general purpose engine which is a preferred embodiment of this invention (as viewed from arrow A in FIG. 2).
Figure 2:
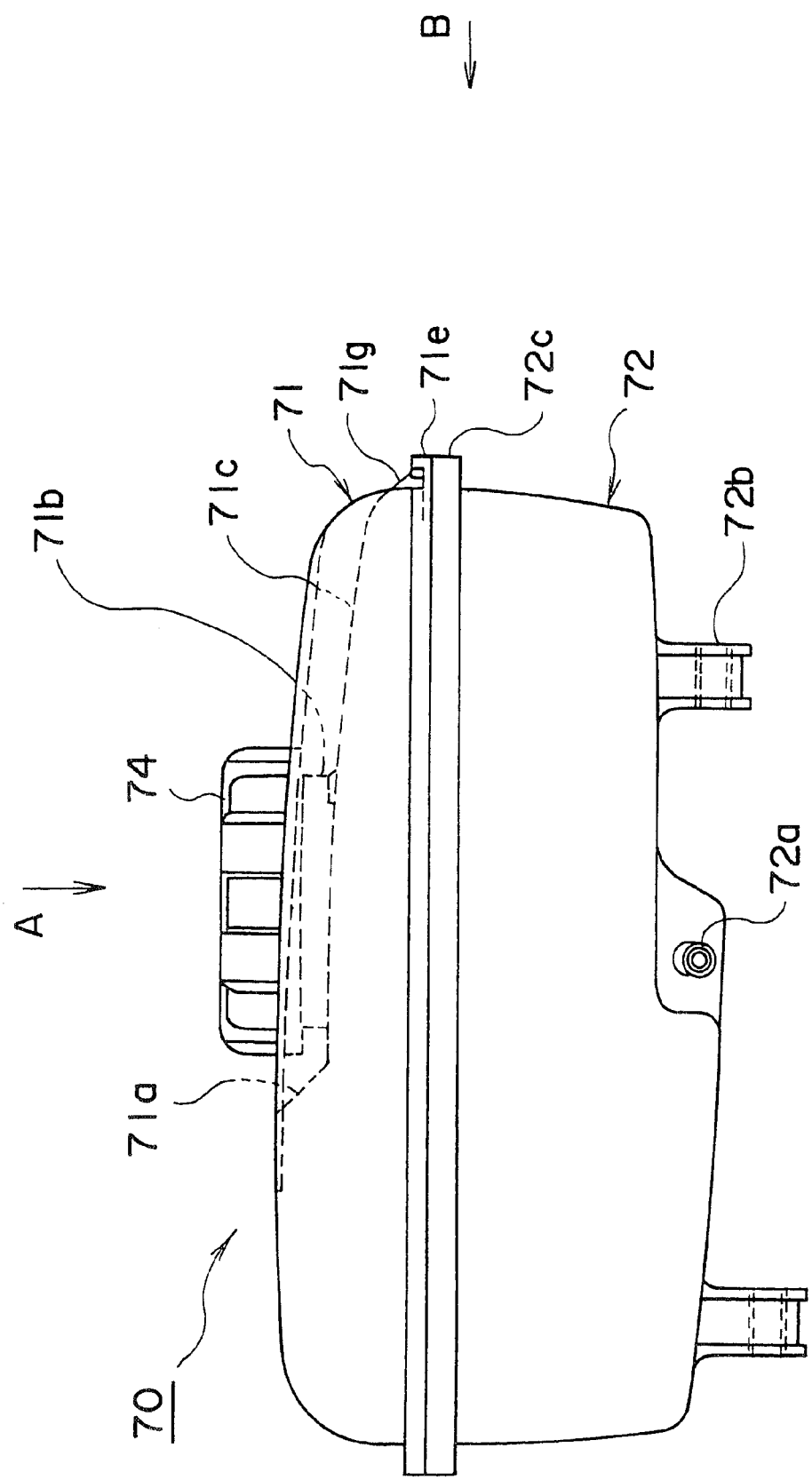
FIG. 2 is a front view of the fuel tank.
Figure 3:
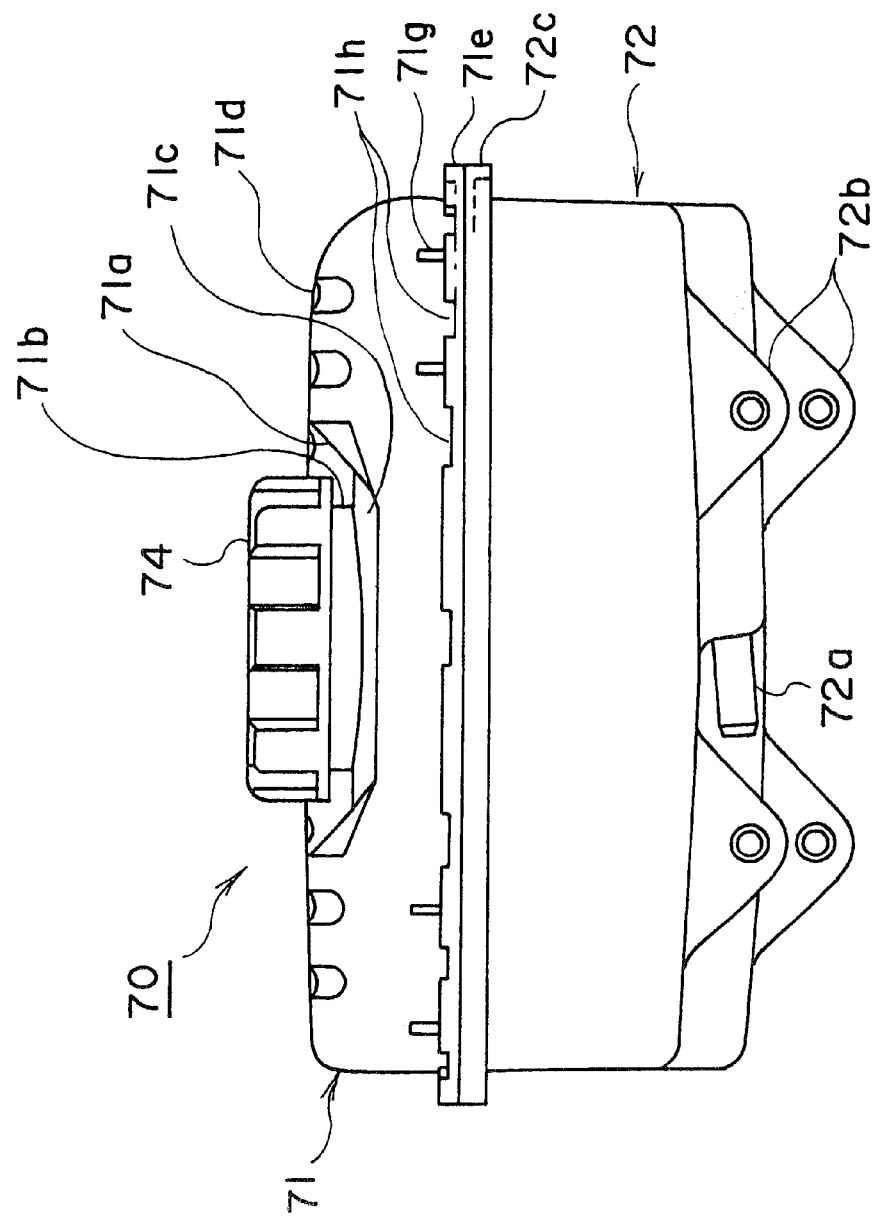
FIG. 3 is a view of the fuel tank as seen from arrow B (i.e., a lateral view).
Figure 4:
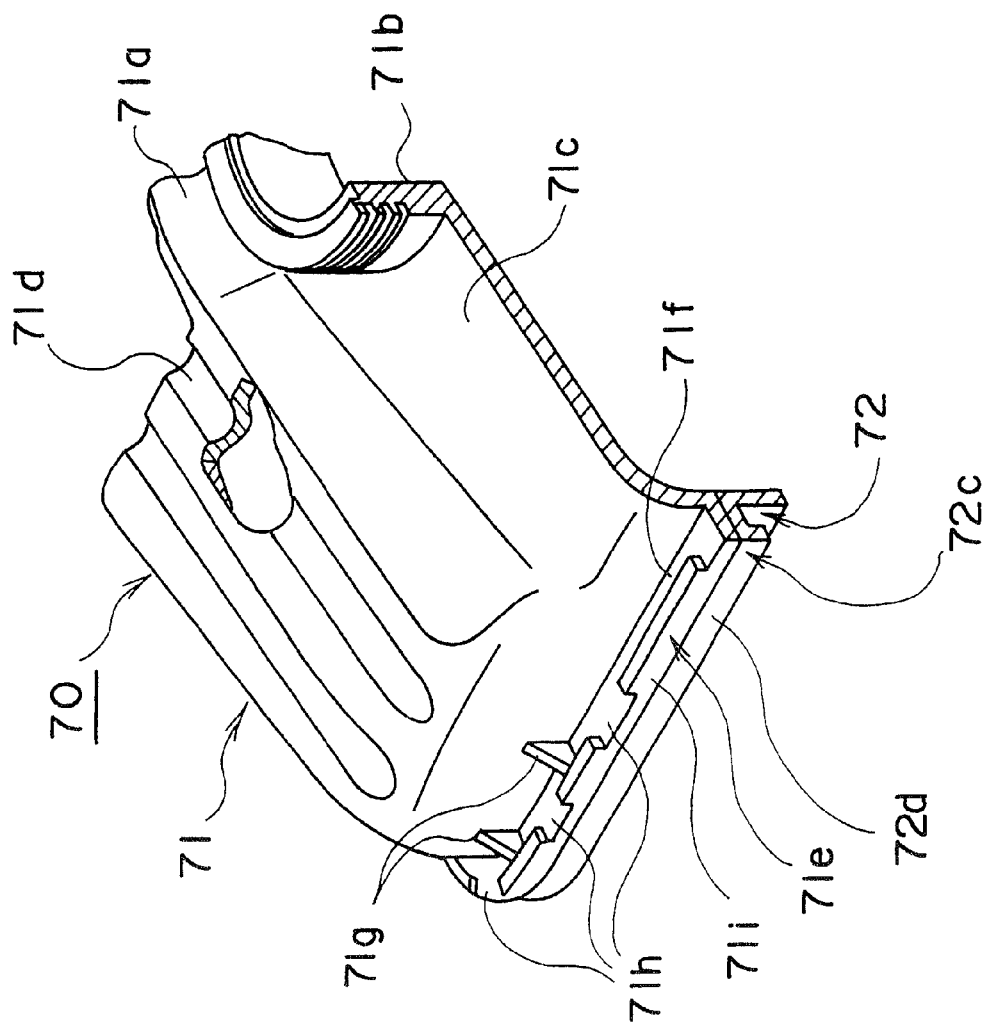
FIG. 4 is a perspective drawing showing a partial front view of the fuel tank.
Figure 5:
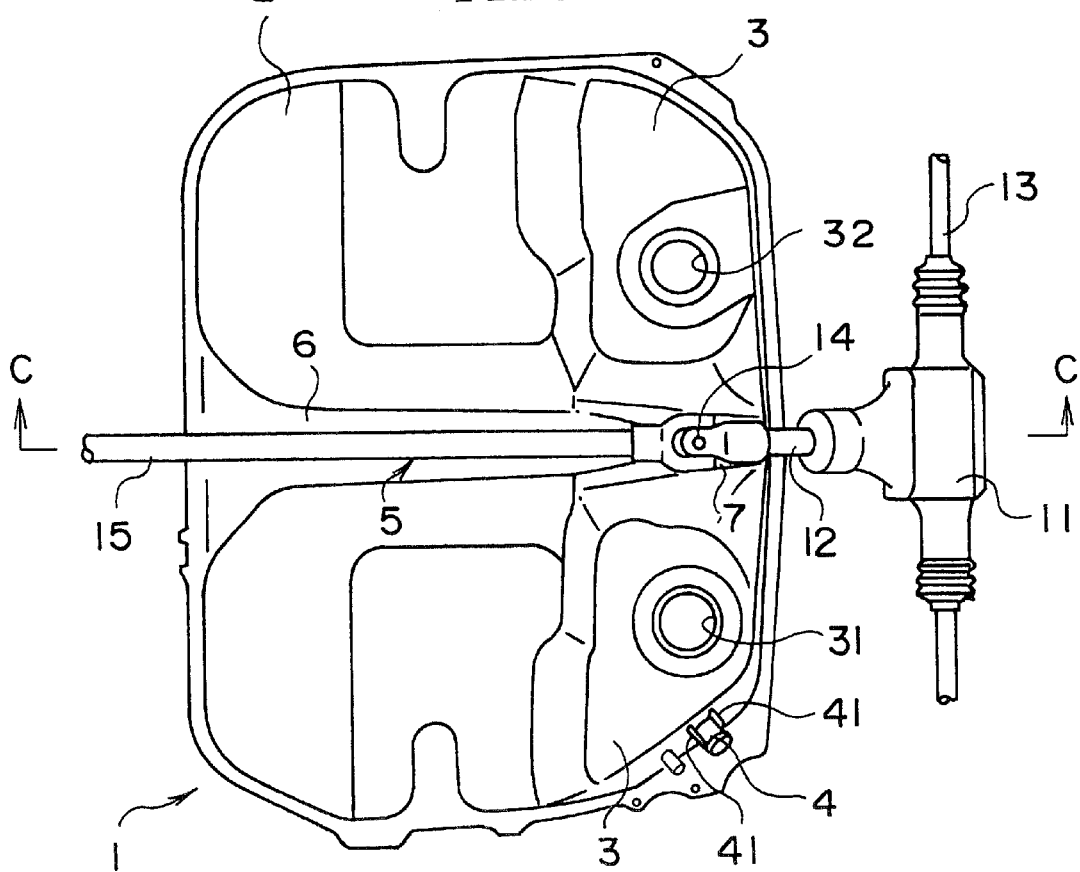
FIG. 5 is a plan view of a fuel tank for an automobile engine which is an example of the prior art.
Figure 6:
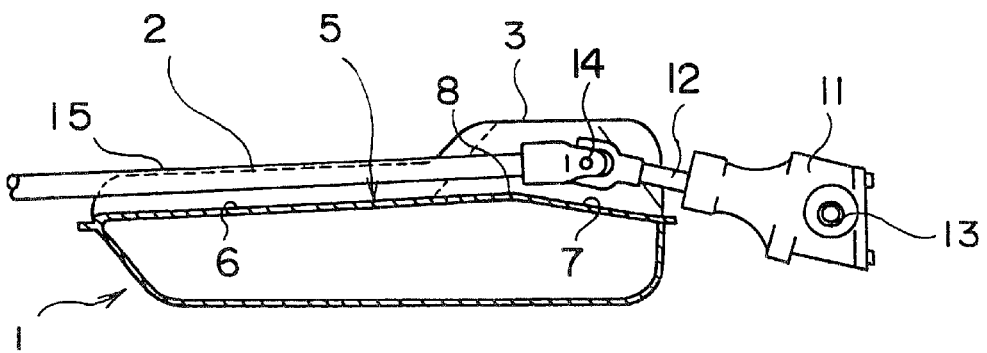
FIG. 6 is a cross section taken along line C—C in FIG. 5.

FIG. 1 is a plan view of the fuel tank of a general purpose engine which is a preferred embodiment of this invention (as viewed from arrow A in FIG. 2). FIG. 2 is a front view of the fuel tank. FIG. 3 is a lateral view of the same fuel tank as seen from arrow B in FIG. 2. FIG. 4 is a perspective drawing showing a partial front view of the fuel tank.

Figure 7:
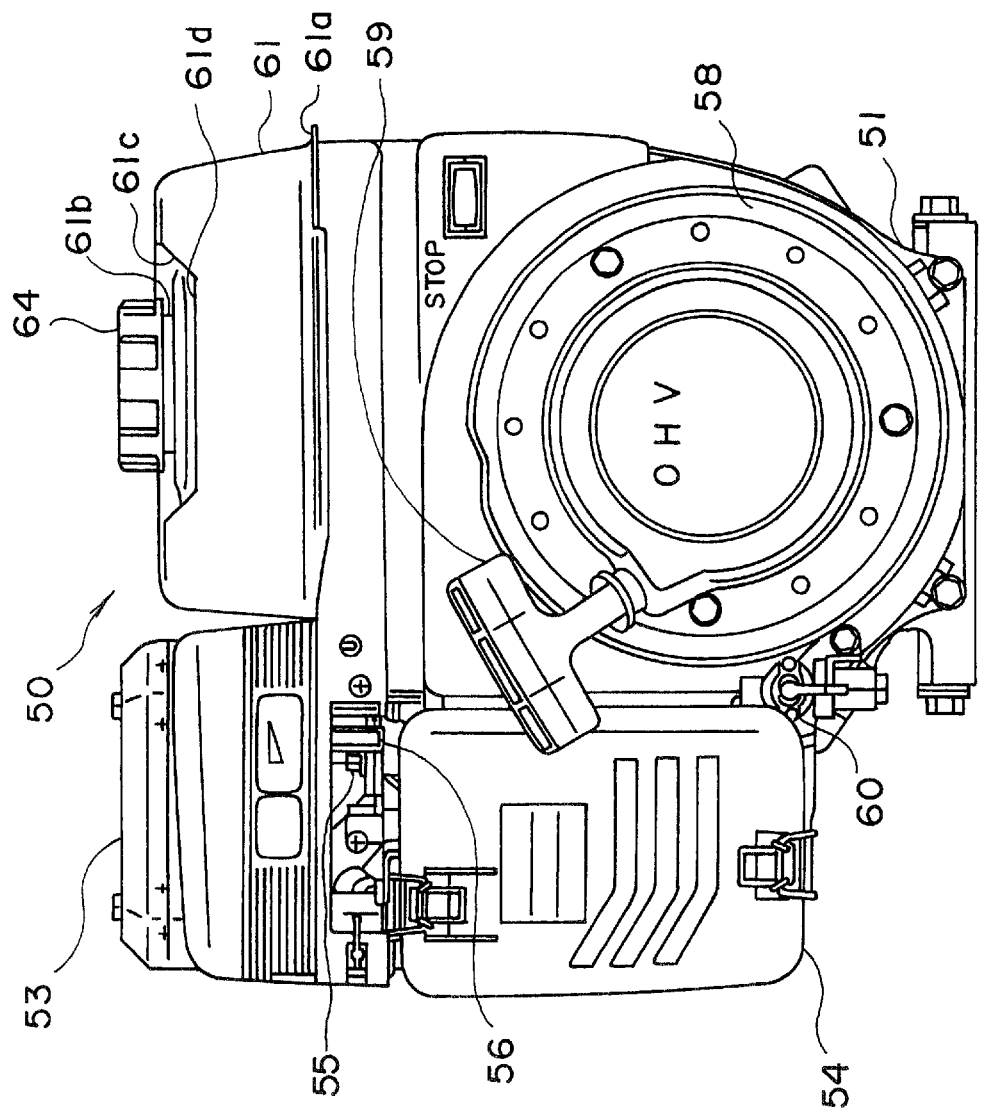
FIG. 7 is a front view of a one-cylinder general purpose engine with a fuel tank belonging to the prior art.
Figure 8:
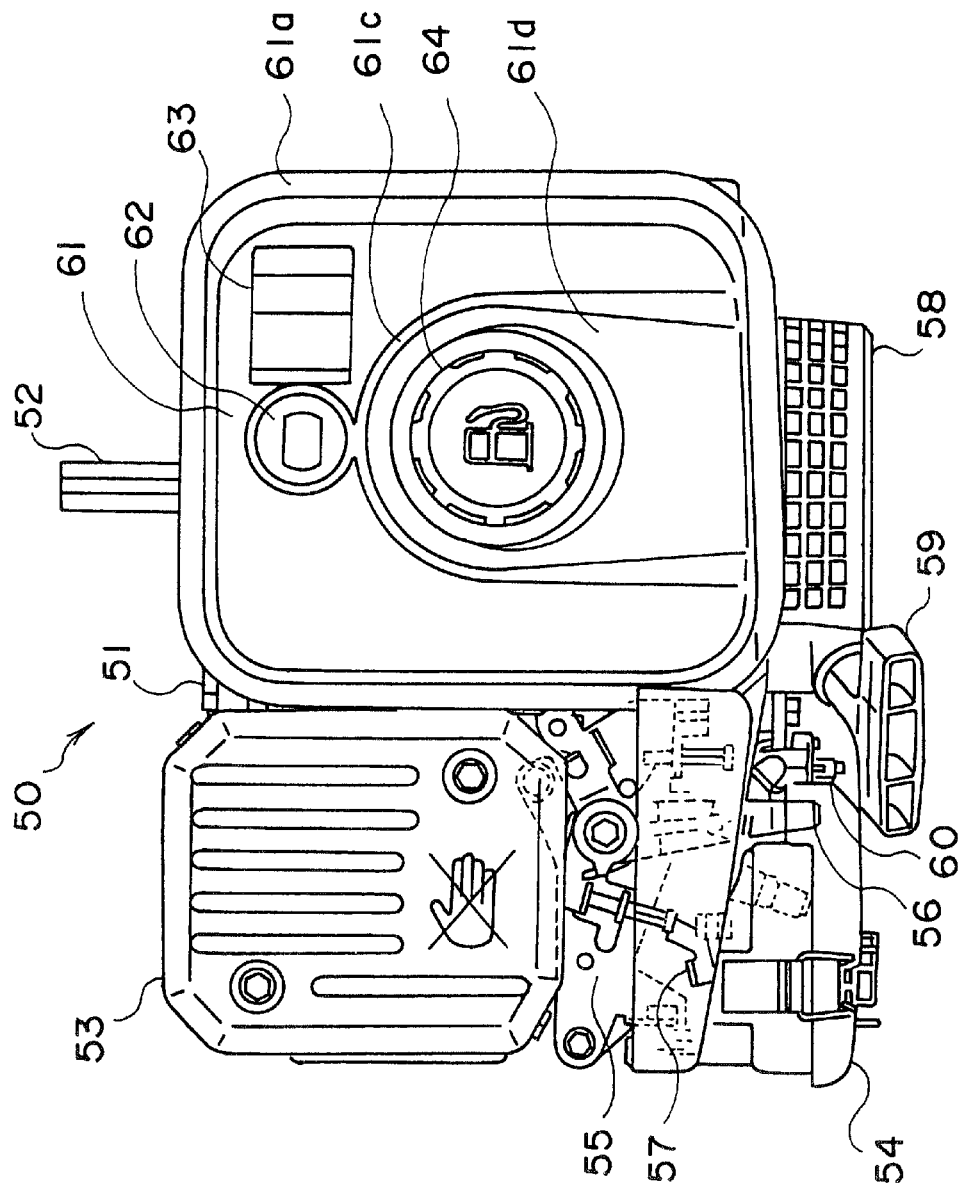
FIG. 8 is a plan view of the same engine belonging to the prior art.

The present invention is an improved version of the fuel tank used primarily in small general purpose engines, as shown in FIGS. 7 and 8. The following explanation will rely on those drawings.

Apart from the fuel tank, the basic configuration of the small general purpose engine relevant to a preferred embodiment of the invention is as shown in FIGS. 7 and 8.

In FIGS. 1 through 4, 70 is the fuel tank, which is configured as described below.

71 and 72 are the upper and lower portions of the tank, which are formed from a synthetic resin. 74 is the cap, which covers fuel inlet 71b (to be discussed shortly) when screwed onto its periphery. 73 is the gauge unit.

The upper portion 71 has a horizontal surface which is virtually square, as can be seen in FIG. 1. It bulges upward like the cover of a pot. From its center, the surface of this upper portion of the tank slopes downward by an appropriate amount toward the side of the tank (in the right direction shown by arrow Z in FIG. 1) where recoil starter 58 is located (See FIGS. 7 and 8). In the other three directions (up, down and to the left in FIG. 1) the surface is virtually level, with curved sides.

In the center of the upper portion 71 is depression 71c, whose sides are formed by conical surface 71a, which itself surrounds fuel inlet 71b, to be discussed shortly. Depression 71c slopes down from the center of the tank to the side on which recoil starter 58 is located (hereafter called the discharge side).

In the center of the area surrounded by the conical surface 71a in depression 71c is fuel inlet 71b. The cap 74 is screwed onto a thread on the periphery of the inlet 71b.

As can be seen in FIG. 2, the bottom of the depression 71c slants downward toward the discharge side of the tank at a slope which is somewhat greater than that of the general surface of upper portion 71.

On either side of the fuel inlet 71b on the top of the upper portion 71 are a number of downward-sloping semicircular grooves 71d (see FIG. 3). These grooves extend from the left of fuel inlet 71b in FIG. 1, on the side opposite the discharge side, all the way to the discharge side of the tank (in the direction shown by arrow Z), where they open to the exterior. Ribbed flange 71e runs along the entire periphery of upper portion 71.

As is shown in FIGS. 3 and 4, gutter 71f runs along the entire periphery of ribbed flange 71e on the upper portion 71. Openings 71h of a specified pitch are provided along the entire periphery of web 71i, which forms the outer wall of the gutter 71f, or at least along the discharge side (the direction shown by arrow Z). These openings connect the gutter 71f with the exterior.

On the discharge side of the tank (the side indicated by arrow Z), gutter 71f is segmented by a number of ribs 71g, which extend from the outer wall of upper portion 71 to web 71i. An opening 71h is provided in each segment created by the ribs.

The lower portion 72 of the tank is shaped like a pan which bulges downward. In order to ensure that it can hold an adequate volume of fuel, its bottom surface is made slightly lower on the side next to the engine body (i.e., the side opposite the discharge side), as can be seen in FIG. 2. On its underside are fuel opening 72a, which is connected to cock 60 (see FIG. 7), and several (here, four) mounting brackets 72b.

Ribbed flange 72c runs along the entire upper edge of lower portion 72. Web 72d of the ribbed flange 72c is aligned with web 71i of ribbed flange 71e on upper portion 71 and vibration-welded.

When a fuel tank 70 having such a configuration is installed on the engine 50 pictured in FIGS. 7 and 8, and the engine is oriented so that it is level, as in FIG. 7, the portion of gutter 71f on upper portion 71 which is near the recoil starter, i.e., the portion of the gutter on the discharge side (indicated by arrow Z in FIG. 1), will be slightly lower than the rest of the gutter.

With such an engine 50, when fuel overflows from the inlet 71b of tank 70 during fueling, the spilled fuel will discharge down conical surface 71a around the inlet and into depression 71c. It will flow along the depression 71c toward the discharge side of the tank (indicated by arrow Z) and enter gutter 71f. From there it will discharge through the three central openings 71h. The fuel will discharge down web 72d of ribbed flange 72c on lower portion 72 and fall to the ground.

Fuel which spills on the tank away from surface 71a and depression 71c will discharge in all directions; however, since the tank slopes measurably toward the discharge side (indicated by arrow Z), most of the fuel will discharge in that direction. Fuel which discharges at a right angle to the discharge side falls into semicircular grooves 71d, which redirect its discharge toward the discharge side (indicated by arrow Z). The fuel eventually enters gutter 71f on the discharge side. It is discharged to the exterior via the five central openings 71h.

Any fuel which does not discharge into the grooves 71d will discharge over the surface of fuel tank 70 into the gutter 71f on the three other sides of the tank. All the fuel in gutter 71f will flow toward the discharge side of the tank and be discharged to the exterior via the two openings 71h on the corners of the tank. Thus the main part of any fuel which spills onto the top of fuel tank 70 and discharges over its surface will travel through depression 71c. Whatever portion discharges to the side will travel through semicircular grooves 71d into gutter 71f. The fuel flows through the gutter 71f, exits via openings 75h on the discharge side of the tank, is conveyed down web 72d on ribbed flange 72c of lower portion 72, and discharges down to the ground. This configuration prevents the spilled fuel from being expelled onto hotter engine components or electrical parts.

Gutter 71f is segmented by a number of ribs. When a large quantity of fuel falls into the gutter, the ribs prevent it from discharging around the periphery of the tank. It can discharge only through openings 71h to the exterior.

Because upper and lower portions 71 and 72 of the fuel tank 70 are made of a lightweight resin, a thicker plate can be achieved without increasing the weight. Semicircular grooves 71d have the effect of enhancing the rigidity of the plate. This increases its strength while suppressing vibration and noise.

The present invention is not limited to the fuel tank for a small general purpose engine described as the preferred embodiment. It is applicable to any fuel tank having a fuel inlet and comprising an upper and lower half joined by a flange, including fuel tanks for automotive engines or the engines in construction equipment or other types of vehicles.

EFFECTS OF THE INVENTION

As is described above, with this invention any fuel which spills onto the top of the fuel tank will discharge down a depression or a number of semicircular grooves formed on the surface of the upper portion of the tank. This fuel will be collected in a gutter which runs along the periphery of the flange and be discharged via a number of openings toward the recoil starter, a component with a relatively low temperature. The fuel travels horizontally along the flange which joins the upper and lower halves of the tank without coming in contact with the hot cylinder or any electrical components. This eliminates the danger of fire and prevents electrical malfunctions.

If the gutter is segmented by ribs, as described in claims 3 and 10, these ribs will prevent the fuel from discharging along the periphery of the flange when a large quantity of fuel enters the gutter. The only route available for the fuel will be to discharge through the openings in the gutter to the exterior. There will be no possibility that the fuel will overflow the gutter or travel around the flange. It will always be channeled toward the recoil starter.

If the tank is configured as described in claim 10, any fuel which spills on it will be discharged on the side of the tank where the recoil starter is located. Since the recoil starter has a relatively low temperature and is unlikely to malfunction, this configuration increases the safety of the tank.

With the configuration described in claim 4, a ribbed flange increases the peripheral rigidity of the tank. The gutter along the flange serves as a discharge route for the fuel.

With the configuration in claim 5, the thickness of the fuel tank is increased without increasing the weight over that of a similar tank made from thin sheet metal. The semicircular grooves improve the rigidity of the upper portion of the tank. The resulting fuel tank is extremely strong and does not suffer from vibration or noise.

With the configuration described in claims 6 through 8, any fuel which splashes or spills onto the top of the upper portion of the fuel tank will discharge down the trapezoidal depression or the semicircular grooves on either side of it. It will travel downhill into the gutter along the ribbed flange and then to the lowest point in the gutter. Here it will be discharged to the exterior through the openings provided. Because the fuel travels along the flange, it has no opportunity to discharge to the side, and come in contact with the hot cylinder or with any electrical components.

With the configuration described in claim 3, the gutter is segmented by ribs. These ribs prevent peripheral discharge when a large quantity of fuel enters the gutter. The fuel is discharged via the openings in the gutter rather than travelling in a peripheral direction.

With this configuration, any fuel which may splash or drip onto the top of the tank, regardless of the quantity, will be collected in the lowest portion of the gutter and be discharged to the exterior. There is absolutely no possibility of a fire or an electrical malfunction due to fuel coming in contact with the hot part of the engine or an electrical component.

Because both the upper and lower portions of the tank are made of synthetic resin, a thicker sheet can be used without increasing the weight over that of a similar quantity of sheet metal. The semicircular grooves on the upper portion of the tank increase its rigidity; the resulting strength helps suppress vibration and noise.

What is claimed is:

1. A fuel tank having an upper portion with a fuel inlet on the top, and a lower portion, both of which are connected with a flange, comprising:

a depression surrounding said fuel inlet on said upper portion which slopes downward toward one side of said fuel tank;

a gutter provided around periphery of said flange; and an opening in said gutter to allow spilled fuel to discharge from said gutter to an exterior;

wherein said gutter provided on at least one side of said periphery of said flange, is segmented by a plurality of ribs to create a segment of said gutter and said opening is provided in said segment.

2. A fuel tank according to claim 1, further comprising a number of semicircular grooves from which said fuel can be discharged in one direction, which are provided on the top of said upper portion in an area not occupied by said depression.

3. A fuel tank according to claim 1, wherein said flange comprises a ribbed flange running along the entire periphery between said upper and lower portions of said fuel tank which are welded at a web of said ribbed flange.

4. A fuel tank according to claim 1, wherein said upper and lower portions of said fuel tank are made of a resin material.

5. A fuel tank having an upper portion with a fuel inlet in the center of the top, and a lower portion, both of which are virtually square, made of a resin material, and connected with a flange, comprising:

a depression surrounding said fuel inlet on said upper portion, of which the cross section is a trapezoid, and which slopes downward toward one side of the fuel tank and opens onto an end;

a groove on either side of the depression and oriented along a same direction as said depression, which opens onto said same side as said depression; and a gutter provided along an entire periphery of said tank, which is formed between said ribbed flange and the periphery of said upper portion, and segmented by a plurality of ribs to form a segment of said gutter on at least one side of said periphery, said gutter segment being provided with an opening extending to an exterior;

wherein said two portions of said tank are welded at a web of a ribbed flange which extends along an entire periphery between said two portions.

6. A fuel tank according to claim 5, wherein said tank comprises a plurality of said grooves with a semicircular cross section.

7. A general purpose engine wherein a fuel tank is provided on top of said engine, said fuel tank having an upper portion which has a fuel inlet on the top and a lower portion mounted to said engine, both of said upper and lower portion being joined together with a flange, a recoil starter being placed at an end of a crankshaft, said general purpose engine comprising;

a depression surrounding said fuel inlet on said upper portion which slopes downward toward a recoil starter;

a gutter provided around periphery of said flange; and an opening in said gutter to allow spilled fuel to discharge from said gutter onto a recoil starter side where said recoil starter is located;

wherein said gutter provided on said recoil starter side, is segmented by a plurality of ribs to create a segment of said gutter and said opening is provided in said gutter segment.

8. A general purpose engine according to claim 7, further comprising a number of semicircular grooves from which said fuel can be discharged to said recoil starter side, which are provided on said top of said upper portion in an area not occupied by said depression.

9. A general purpose engine according to claim 7, wherein said fuel tank is mounted on said engine in such a way that a portion of said gutter on the same side as said recoil starter is lower than rest of said gutter.

10. A fuel tank having an upper portion with a fuel inlet on the top, and a lower portion, both of which are connected with a flange, comprising:

a depression surrounding said fuel inlet on said upper portion which slopes downward toward one side of said fuel tank;

a gutter provided around periphery of said flange; and an opening in said gutter to allow spilled fuel to discharge from said gutter to an exterior;

wherein said flange comprises a ribbed flange running along the entire periphery between said upper and lower portions of said fuel tank which are welded at a web of said ribbed flange.

* * * * *